(12) United States Patent
Murai et al.

(10) Patent No.: US 12,549,033 B2
(45) Date of Patent: Feb. 10, 2026

(54) WIRELESS POWER TRANSMISSION SYSTEM AND COMPUTER-READABLE STORAGE MEDIUM STORING A PROGRAM FOR ESTIMATING POWER EXPOSURE ON HUMAN BODY

(71) Applicant: OMRON Corporation, Kyoto (JP)

(72) Inventors: Akito Murai, Kyoto (JP); Manh Tai Nguyen, Kyoto (JP)

(73) Assignee: OMRON Corporation, Kyoto (JP)

( * ) Notice: Subject to any disclaimer, the term of this patent is extended or adjusted under 35 U.S.C. 154(b) by 777 days.

(21) Appl. No.: 17/792,437

(22) PCT Filed: Jan. 28, 2021

(86) PCT No.: PCT/JP2021/002944
§ 371 (c)(1),
(2) Date: Jul. 13, 2022

(87) PCT Pub. No.: WO2021/161788
PCT Pub. Date: Aug. 19, 2021

(65) Prior Publication Data
US 2023/0006479 A1 Jan. 5, 2023

(30) Foreign Application Priority Data
Feb. 14, 2020 (JP) .................. 2020-023113

(51) Int. Cl.
*H02J 7/00* (2006.01)
*H02J 50/23* (2016.01)
(Continued)

(52) U.S. Cl.
CPC ............ *H02J 50/23* (2016.02); *H02J 50/402* (2020.01); *H02J 50/60* (2016.02); *H02J 50/80* (2016.02); *H04B 5/48* (2024.01)

(58) Field of Classification Search
None
See application file for complete search history.

(56) References Cited

U.S. PATENT DOCUMENTS

| 2015/0365138 A1* | 12/2015 | Miller ............... H04B 5/79 307/104 |
| 2016/0064943 A1 | 3/2016 | Ku et al. |

(Continued)

FOREIGN PATENT DOCUMENTS

| CN | 105391184 A | 3/2016 |
| CN | 107040048 A | 8/2017 |

(Continued)

OTHER PUBLICATIONS

An extended European search report (EESR) issued on Aug. 2, 2023 in a counterpart European patent application.

(Continued)

*Primary Examiner* — Arun C Williams
(74) *Attorney, Agent, or Firm* — METROLEX IP LAW GROUP, PLLC; Robert L. Scott, Esq.

(57) ABSTRACT

A wireless power transmission system includes a power transmitter that outputs a power transmission radio wave, a plurality of wireless sensors that receive power, and at least one human body tag to be carried on a human body in an environment. The power transmitter communicates with the at least one human body tag in each slot to estimate power exposure on a human body per slot for a human body carrying the at least one human body tag, calculates power exposure on a human body per cycle as an average of power exposure on a human body for all slots, and limits power transmission to the wireless sensors in response to the power exposure on a human body per cycle exceeding a predetermined value.

6 Claims, 5 Drawing Sheets

(51) Int. Cl.
    *H02J 50/40*     (2016.01)
    *H02J 50/60*     (2016.01)
    *H02J 50/80*     (2016.01)
    *H04B 5/48*     (2024.01)

(56) References Cited

U.S. PATENT DOCUMENTS

| | | |
|---|---|---|
| 2016/0064994 A1 | 3/2016 | Ku et al. |
| 2016/0301252 A1* | 10/2016 | Govindaraj ............. H02J 50/12 |
| 2017/0077736 A1 | 3/2017 | Leabman |
| 2017/0110888 A1 | 4/2017 | Leabman |

FOREIGN PATENT DOCUMENTS

| | | |
|---|---|---|
| JP | 2010-226604 A | 10/2010 |
| JP | 2012-191268 A | 10/2012 |
| JP | 2019-13100 A | 1/2019 |

OTHER PUBLICATIONS

An Office Action (CNOA) issued on Dec. 12, 2024 in corresponding CN patent application No. 202180008771.3.
An English translation of the International Search Report ("ISR") of PCT/JP2021/002944 mailed on Mar. 30, 2021.
The Written Opinion("WO") of PCT/JP2021/002944 mailed on Mar. 30, 2021.

\* cited by examiner

WIRELESS POWER TRANSMISSION SYSTEM AND COMPUTER-READABLE STORAGE MEDIUM STORING A PROGRAM FOR ESTIMATING POWER EXPOSURE ON HUMAN BODY

FIELD

The present disclosure relates to a wireless power transmission system and computer-readable storage medium storing a program for estimating power exposure on a human body executable in the wireless power transmission system.

BACKGROUND

Wireless power transmission systems are to reduce adverse effects of radio waves for power transmission on people or devices in an environment in which power is transmitted (power transmission radio waves are emitted). Patent Literature 1 describes, for example, a wireless power transmission system that detects a wireless tag around a transmitter and switches the state of power transmission in accordance with the detection result (e.g., lowers transmission power in response to a wireless tag being detected).

CITATION LIST

Patent Literature

Patent Literature 1: Japanese Unexamined Patent Application Publication No. 2012-191268

SUMMARY

The wireless tags in Patent Literature 1 are used with devices (e.g., pacemakers) to avoid power transmission radio waves. A wireless tag can also be used to reduce power exposure on a human body carrying the wireless tag (power density). The technique described in Patent Literature 1 simply detects any wireless tag in an environment and cannot limit its transmission power in response to power exposure on a human body exceeding a predetermined value.

For a human (human body) in an environment including power transmission radio waves, the transmission power to a power transmission target is to be increased but power exposure on a human body is to be reduced. To reduce power exposure on a human body, the total power exposure on a human body during power transmission to the power transmission target is to be determined.

To determine the total power exposure on a human body, a wireless tag that can measure power exposure may be carried on a human body. A signal from the wireless tag may be used to detect whether the human body is in the environment or to estimate power exposure on the human body. An estimated value of power exposure on the human body can be compared with a predetermined value. In response to the estimated value exceeding the predetermined value, the transmission power is limited (the output is reduced or stopped) to reduce power exposure on the human body.

To practically estimate power exposure on a human body using a wireless tag carried on a human body, a single wireless tag may be attached to a predetermined human body part (e.g., the head), and a signal from the single wireless tag may be used to estimate the total power exposure on the human body. However, metal components in an environment may form multiple paths with radio wave reflection and cause varying levels of power exposure on different parts of the human body (e.g., the head, abdomen, and feet). Thus, using a signal from the single wireless tag can cause a greater error in estimating the total power exposure on the human body.

The transmission power may not be limited appropriately due to a greater estimation error in the estimated value of power exposure on the human body. For example, the estimated value of power exposure on the human body greater than the actual value may excessively limit the transmission power and cause less power to be transmitted to the power transmission target. The estimated value of power exposure on the human body less than the actual value may inappropriately limit the transmission power and cause power exposure on the human to exceed the predetermined value.

One or more embodiments are directed to a wireless power transmission system and a program for estimating power exposure on a human body that may estimate power exposure on a human body with a decreased estimation error.

A wireless power transmission system according to a first aspect of the present invention includes a host unit that outputs a power transmission radio wave, a plurality of secondary units that receive power from the power transmission radio wave, and at least one human body tag to be carried on a human body in an environment in which the host unit transmits power. The at least one human body tag wirelessly communicates with the host unit. Power transmission from the host unit to the plurality of secondary units undergoes directivity control using different antenna directivity for each of the plurality of secondary units. Directivity control for a secondary unit of the plurality of secondary units is performed for one slot. Directivity control for all the plurality of secondary units is performed for one cycle. The host unit communicates with the at least one human body tag in each slot to estimate power exposure on a human body per slot for a human body carrying the at least one human body tag, calculates power exposure on a human body per cycle based on the estimated power exposure on a human body in each slot, and limits power transmission to the plurality of secondary units in response to the power exposure on a human body per cycle exceeding a predetermined value.

This structure uses power exposure on a human body in each slot to calculate the power exposure on a human body per cycle with a decreased estimation error compared with power exposure on a human body in each slot, thus estimating the power exposure on a human body with a decreased estimation error.

In the above wireless power transmission system, the host unit may communicate with the at least one human body tag in each slot to estimate power exposure on a human body per slot for a human body carrying the at least one human body tag and calculate power exposure on a human body per cycle as an average of power exposure on a human body for all slots or for one or more slots.

In the above wireless power transmission system, the at least one human body tag may measure received power from a signal received from the host unit to transmit the measured received power to the host unit. The host unit may estimate power exposure on a human body per slot based on the measured received power transmitted from the at least one human body tag.

A program for estimating power exposure on a human body according to a second aspect of the present invention is executable in a wireless power transmission system including a host unit that outputs a power transmission radio wave and a plurality of secondary units that receive power from the power transmission radio wave. The program is executable to estimate power exposure on a human body in an environment in which the host unit transmits power. The system includes at least one human body tag to be carried on a human body in the environment in which the host unit transmits power. The at least one human body tag wirelessly communicates with the host unit. Power transmission from the host unit to the plurality of secondary units undergoes directivity control using different antenna directivity for each of the plurality of secondary units. The host unit includes a power exposure estimator that estimates, based on a result of communication with the at least one human body tag in each slot, power exposure on a human body per slot for a human body carrying the at least one human body tag and calculates power exposure on a human body per cycle based on the estimated power exposure on a human body in each slot, and a transmission power limiter that limits power transmission to the plurality of secondary units in response to the power exposure on a human body per cycle exceeding a predetermined value. The program causes a computer included in the host unit to function as the power exposure estimator and the transmission power limiter.

In the above program, the power exposure estimator may estimate, based on a result of communication with the at least one human body tag in each slot, power exposure on human body per slot for a human body carrying the at least one human body tag, and calculate power exposure on a human body per cycle as an average of power exposure on a human body for all slots or for one or more slots.

The wireless power transmission system and the program for estimating power exposure on a human body according to one or more embodiments use power exposure on a human body for multiple slots to determine power exposure on a human body per cycle and thus estimate the power exposure on a human body with a decreased estimation error.

DETAILED DESCRIPTION

One or more embodiments of the present invention will now be described with reference to the drawings.

An example use of a wireless power transmission system (hereafter, the system) according to one or more embodiments of the present invention is, for example, a wireless sensor system installed at a factory or another facility. Various robots used at a factory or another facility are controlled using various sensors (e.g., position sensors). The sensors may be powered by wireless power transmission using microwaves. In this case, workers at the factory are also exposed to power transmission radio waves. Power exposure on the human body of each worker is to be maintained under a predetermined value (based on the safety standards in the Radio Radiation Protection Guidelines). An example method for estimating power exposure on a human body for such use will be described below. However, the use of the system is not limited to the above example. For example, the wireless power transmission system according to one or more embodiments of the present invention may include a secondary unit that receives power from a host unit to perform a predetermined operation and communication associated with the operation with the host unit. The secondary unit is not limited to a wireless sensor.

Figure 1:
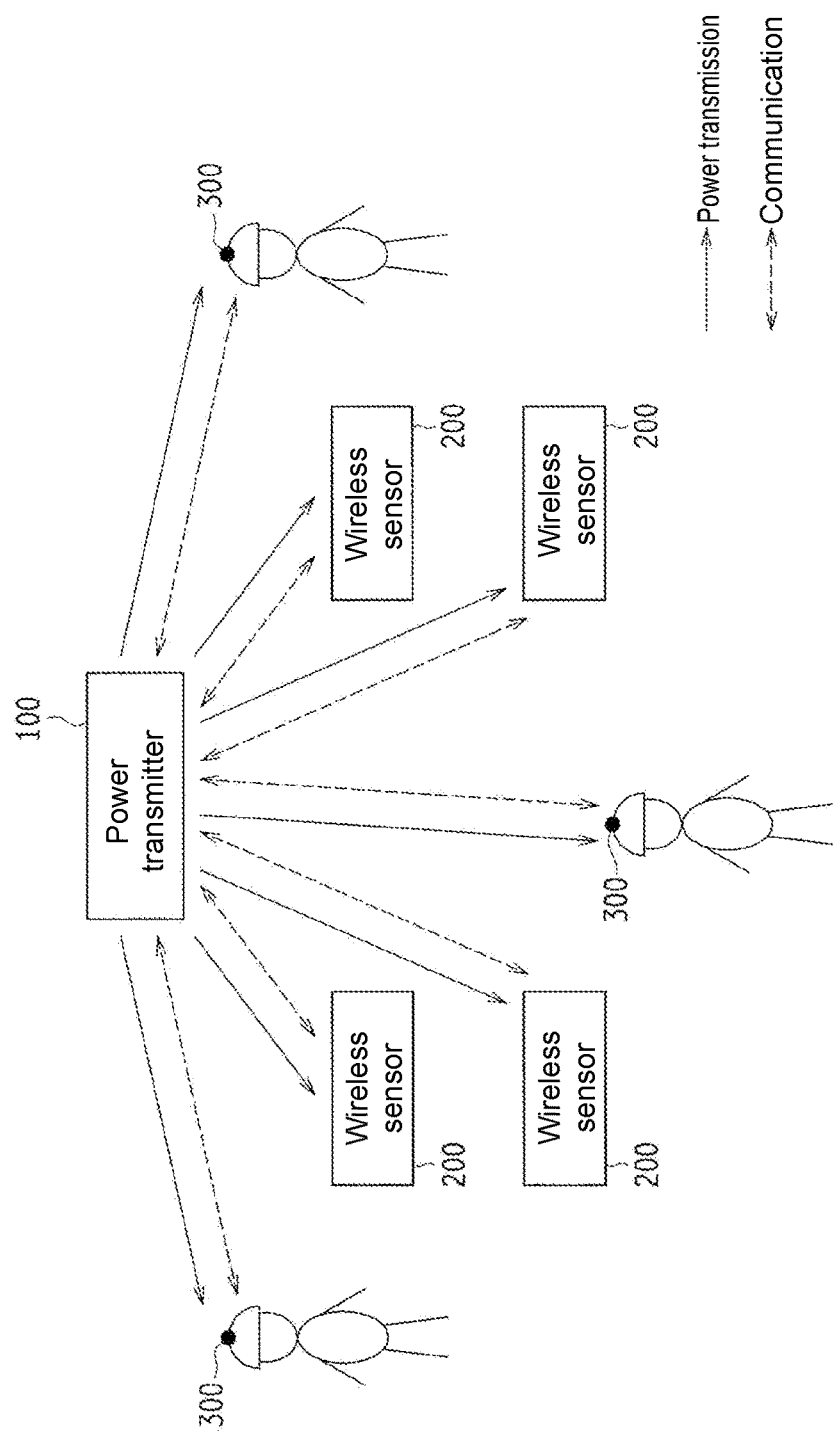
FIG. 1 is a schematic diagram illustrating a wireless power transmission system according to one or more embodiments showing an example structure.

FIG. 1 is a schematic diagram of the system. The system includes a power transmitter (host unit) 100, wireless sensors (secondary units) 200, and human body tags 300. The power transmitter 100 transmits power to the wireless sensors 200, communicates data with the wireless sensors 200, and obtains sensing information from the wireless sensors 200. The system includes multiple wireless sensors 200.

Each human body tag 300 is attached to, for example, a helmet of a worker to measure power exposure around the head of the worker. The power transmitter 100 transmits power to any human body tag 300 in an environment in which the power transmitter 100 transmits power, communicates wirelessly with the human body tag 300, and obtains sensing information (the measurement result of power exposure) from the human body tag 300.

Figure 2:
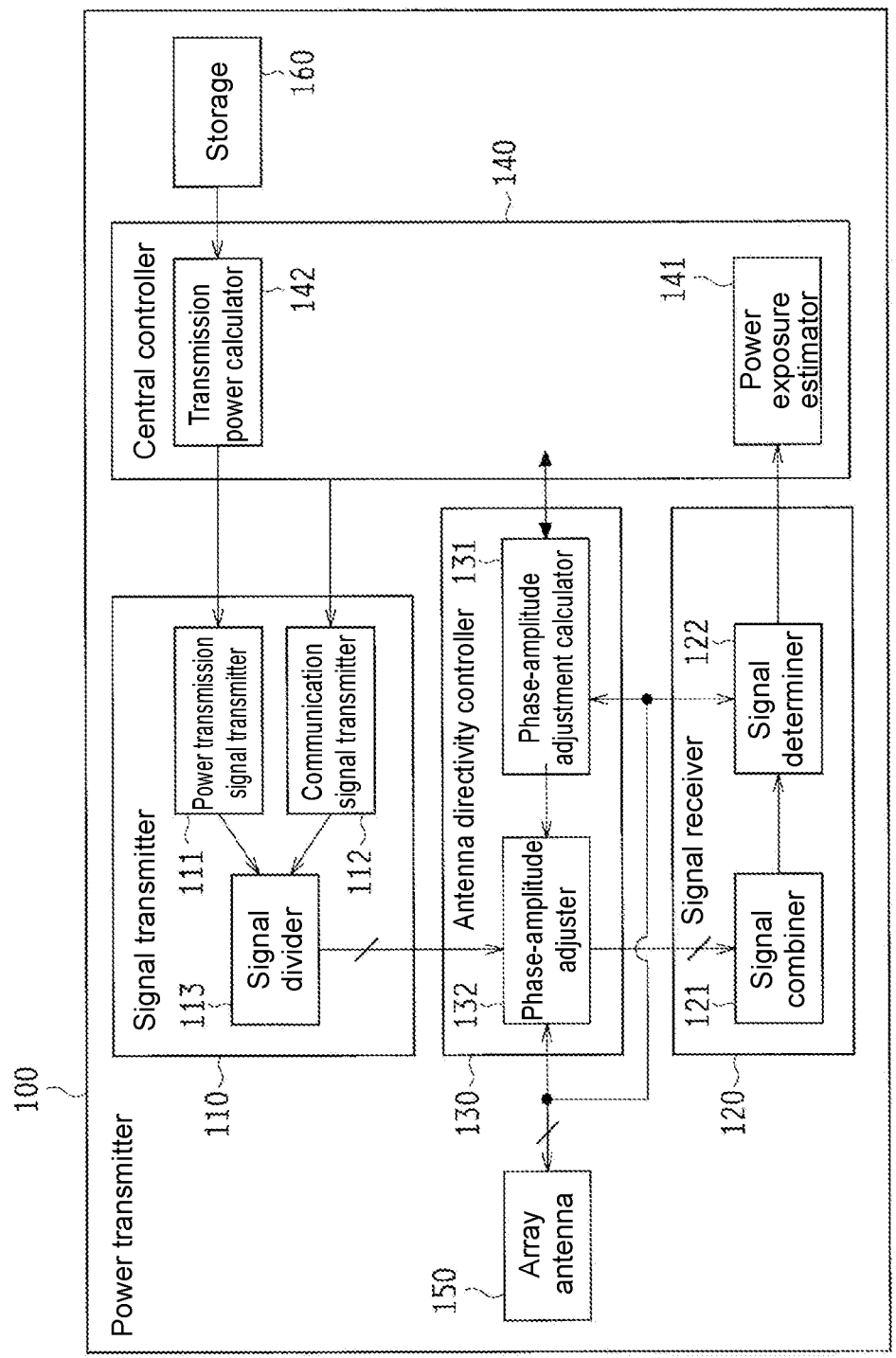
FIG. 2 is a schematic functional block diagram illustrating a power transmitter included in a wireless power transmission system, such as is illustrated in FIG. 1.

FIG. 2 is a schematic functional block diagram of the power transmitter 100 included in the system. The power transmitter 100 includes a signal transmitter 110, a signal receiver 120, an antenna directivity controller 130, and a central controller 140 as main components, and further includes an array antenna 150 and a storage 160.

The signal transmitter 110 includes a power transmission signal transmitter 111, a communication signal transmitter 112, and a signal divider 113. The power transmission signal transmitter 111 generates a power transmission signal (power transmission radio waves) for transmitting power to the wireless sensor 200 or the human body tag 300. The communication signal transmitter 112 generates a communication signal for communication with the wireless sensor 200 or the human body tag 300. The signal divider 113 divides the generated power transmission signal and communication signal into multiple signals to control antenna directivity as described later.

The signal receiver 120 includes a signal combiner 121 and a signal determiner 122. The array antenna 150 includes multiple antenna elements. The power transmitter 100 thus receives a reception signal that is a set of multiple signals received by the antenna elements included in the array antenna 150. The signal combiner 121 combines the multiple signals received by the array antenna 150 into the single reception signal. The signal determiner 122 performs a determination about the reception signal combined by the signal combiner 121. The determination performed by the signal determiner 122 will be described in more detail later.

The antenna directivity controller 130 controls the directivity of the array antenna 150 to improve power transmission efficiency during power transmission to the wireless sensors 200. The antenna directivity controller 130 includes a phase-amplitude adjustment calculator 131 and a phase-amplitude adjuster 132. As described above, the array antenna 150 includes the multiple antenna elements. The phases and amplitudes of the antenna elements can be electrically controlled to control directivity. The phase-amplitude adjustment calculator 131 calculates the phases and amplitudes of antenna elements to achieve intended antenna directivity. The phase-amplitude adjuster 132 uses a calculation result from the phase-amplitude adjustment calculator 131 to adjust the phases and amplitudes of the antenna elements.

The central controller 140 controls the entire power transmitter 100, and specifically functions to increase transmission power to the wireless sensors 200 and to reduce power exposure on a human body (worker). The central controller 140 thus includes a power exposure estimator 141 and a transmission power calculator 142. The power exposure estimator 141 uses a result of determination performed by the signal determiner 122 using the reception signal from the human body tag 300 to estimate power exposure on the human body of each worker carrying the human body tag 300. The transmission power calculator 142 uses the estimated value from the power exposure estimator 141 to calculate the power (transmission power) of a power transmission signal. The power transmitter 100 stores, in the storage 160, a table including the correspondence between power exposure on a human body and the corresponding appropriate transmission power. The transmission power calculator 142 inputs the estimated value of power exposure on a human body into the above table, reads the corresponding appropriate transmission power, and calculates the transmission power.

Figure 3:
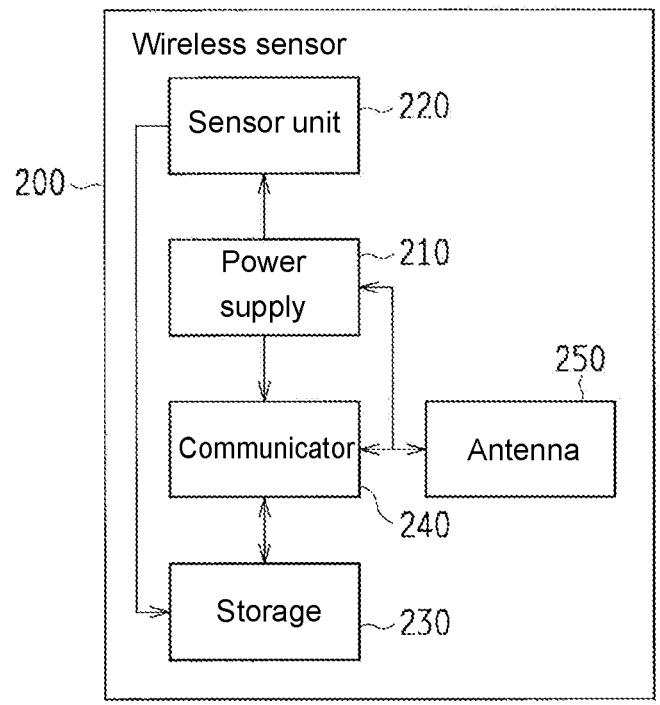
FIG. 3 is a schematic functional block diagram illustrating a wireless sensor included in a wireless power transmission system, such as is illustrated in FIG. 1.

FIG. 3 is a schematic functional block diagram of a wireless sensor 200 included in the system. The wireless sensor 200 includes a power supply 210, a sensor unit 220, a storage 230, a communicator 240, and an antenna 250.

The power supply 210 converts a power transmission signal transmitted from the power transmitter 100 into direct current, which is then supplied to other processing units (the sensor unit 220 and the communicator 240 in this embodiment) as operation power. The power supply 210 includes a rechargeable battery (not shown), which is charged for use by power obtained from the power transmission signal during a power transmission period. The sensor unit 220 performs an intended sensing operation. The sensing operation performed by the sensor unit 220 is not limited to a particular operation and may be, for example, position detection with a position sensor or temperature measurement with a temperature sensor. The storage 230 temporarily stores sensing information obtained by the sensor unit 220 before the information is transmitted to the power transmitter 100. The communicator 240 communicates data with the power transmitter 100. In other words, the communicator 240 transmits the sensing information stored in the storage 230 in response to a command signal from the power transmitter 100.

Figure 4:
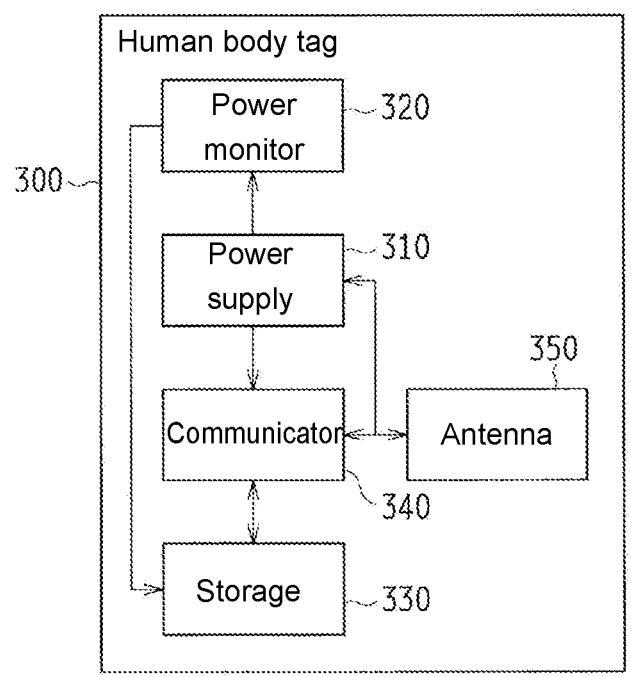
FIG. 4 is a schematic functional block diagram illustrating a human body tag included in a wireless power transmission system, such as is illustrated in FIG. 1.

FIG. 4 is a schematic functional block diagram of the human body tag 300 included in the system. The human body tag 300 includes a power supply 310, a power monitor 320, a storage 330, a communicator 340, and an antenna 350. The structures of the power supply 310, the storage 330, the communicator 340, and the antenna 350 in the human body tag 300 may be basically the same as the structures of the power supply 210, the storage 230, the communicator 240, and the antenna 250 in the wireless sensor 200. The power monitor 320 measures the received power of a reception signal received from the power transmitter 100. The received power measured by the power monitor 320 is temporarily stored into the storage 330 and is transmitted in response to a command signal from the power transmitter 100.

Figure 5:
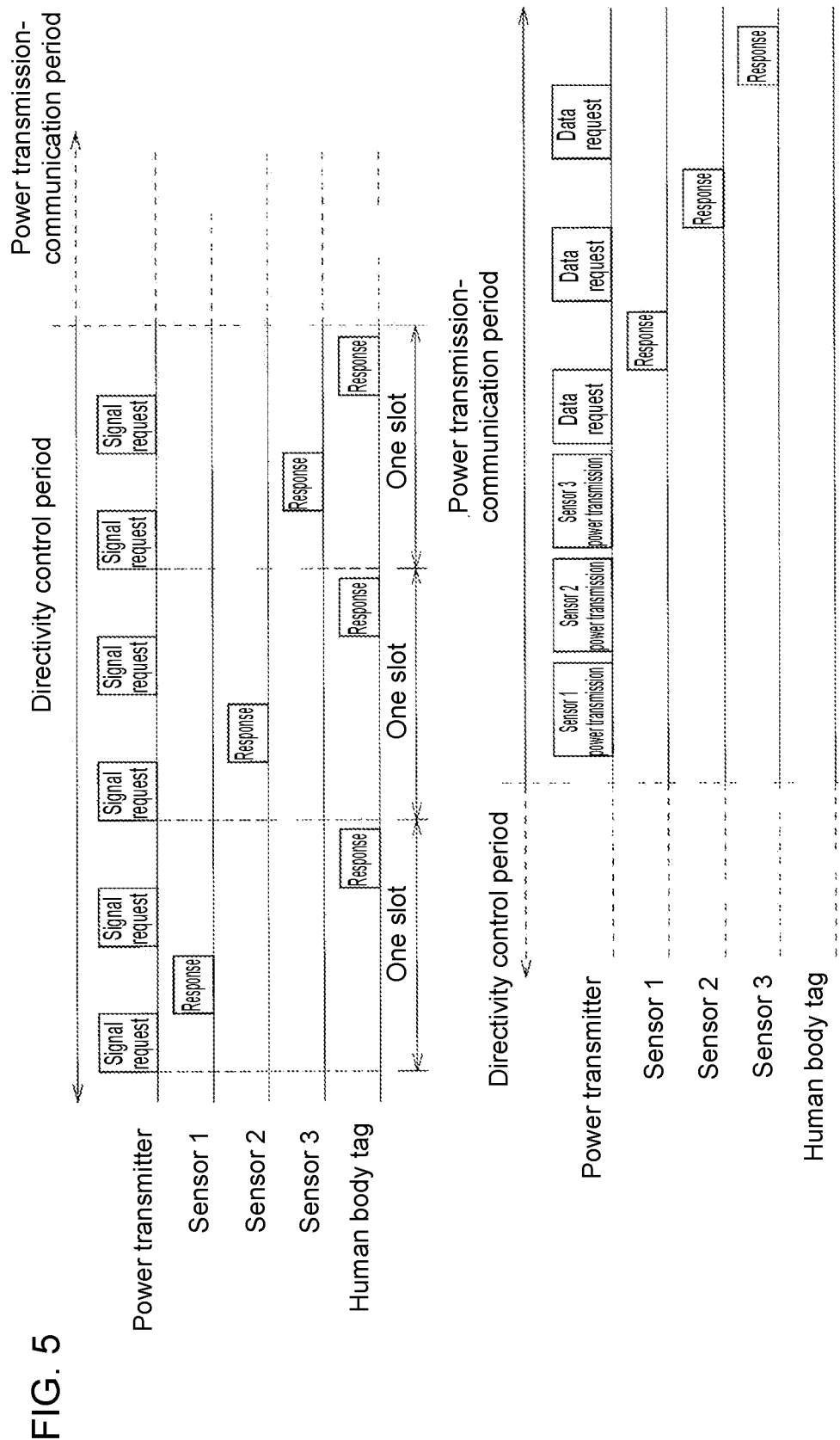
FIG. 5 is a timing chart illustrating a power transmission and communication procedure in one cycle in a wireless power transmission system, such as is illustrated in FIG. 1.
Figure 6:
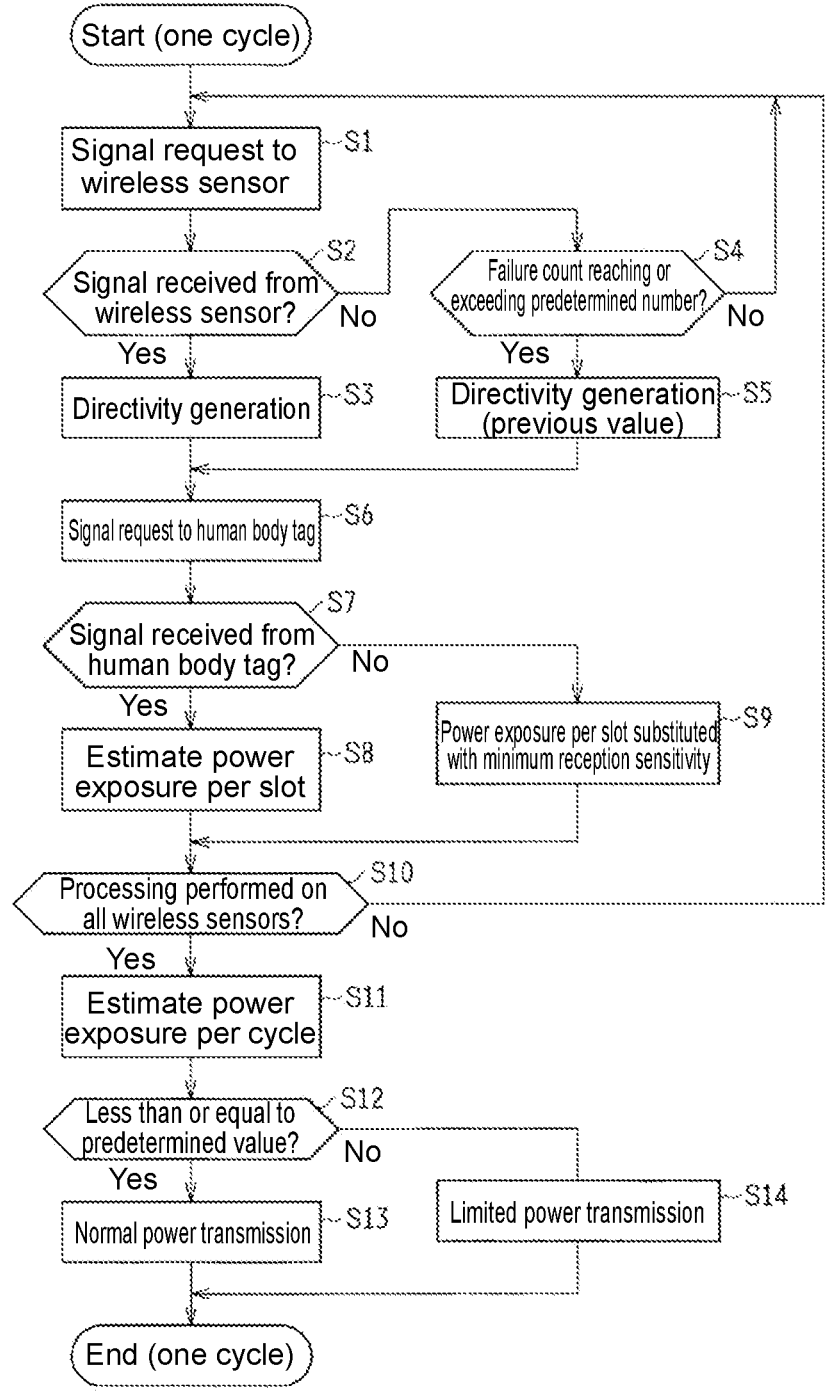
FIG. 6 is a flowchart illustrating a control operation performed in one cycle by a power transmitter in a wireless power transmission system, such as is illustrated in FIG. 1.

The operation of the system will be described in detail with reference to FIGS. 5 and 6. FIG. 5 is a timing chart of a power transmission and communication procedure in one cycle in the system. FIG. 6 is a flowchart of a control operation performed in one cycle by the power transmitter 100.

In the system, the operation of the system performed in one cycle substantially includes a directivity control period and a power transmission-communication period as shown in FIG. 5. The system includes three wireless sensors 200 (sensors 1 to 3 in FIG. 5) and a single human body tag 300.

In the directivity control period, the power transmitter 100 first transmits a signal request selectively to one wireless sensor 200 (S1 in FIG. 6). Upon receiving the signal request, the wireless sensor 200 (e.g., the sensor 1 in FIG. 5) responds to the request (transmits a response signal). During the directivity control period, the response signal from the wireless sensor 200 includes information (e.g., radio wave strength for the wireless sensor 200) used for antenna directivity control in the power transmitter 100.

Upon receiving the response signal from the wireless sensor 200 (Yes in S2), the power transmitter 100 uses the response signal to generate antenna directivity for the wireless sensor 200 (S3). More specifically, the signal determiner 122 in the power transmitter 100 extracts information from the response signal from the wireless sensor 200 and outputs the extracted information to the phase-amplitude adjustment calculator 131. The phase-amplitude adjustment calculator 131 uses the information to calculate the phases and amplitudes of the antenna elements to generate antenna directivity.

When the power transmitter 100 fails to receive a signal from the wireless sensor 200 (No in S2), the processing in steps S1 and S2 is repeated until the failure count reaches a predetermined number (No in S4). When the failure count reaches or exceeds the predetermined number (Yes in S4), the antenna directivity for the wireless sensor 200 is set to the same value as a previous value (S5).

Subsequent to step S3 or step S5, the power transmitter 100 transmits a signal request to the human body tag 300 (S6). Upon receiving the signal request, the human body tag 300 responds to the signal request (transmits a response signal). The response signal from the human body tag 300 includes information about received power from the power transmission signal measured by the power monitor 320 in the human body tag 300.

Upon receiving the response signal from the human body tag 300 (Yes in S7), the power transmitter 100 uses the signal to estimate power exposure per slot on the human body carrying the human body tag 300 (S8). More specifically, the signal determiner 122 in the power transmitter 100 extracts information (received power from the power transmission signal) from the response signal from the human body tag 300 and outputs the extracted information to the power exposure estimator 141. The power exposure estimator 141 includes a conversion formula or a conversion table that uses the received power from the power transmission signal to calculate power exposure on a human body. Thus, power exposure on a human body can be estimated using the conversion formula or the conversion table. The conversion formula or the conversion table for calculating (estimating) power exposure on a human body is obtained experimentally in advance.

When the power transmitter 100 receives no response signal from the human body tag 300 (No in S7), the power exposure per slot is substituted with minimum reception sensitivity (S9). In other words, when the power transmitter 100 receives no response signal from the human body tag 300, radio waves to the human body tag 300 may be in an inappropriate state, causing a communication failure. In this case, the minimum reception sensitivity is expected to correspond to the power exposure on a human body.

A single slot in this example includes a directivity generation process for a single wireless sensor 200 followed by an estimation process that uses the human body tag 300 to estimate power exposure on a human body. In the above example using three wireless sensors 200, the directivity control period includes three slots. Although the above example includes the single human body tag 300, other examples may include multiple human body tags 300. For multiple human body tags 300, the processing in steps S6 to S9 may be repeated in each slot for each of the human body tags 300.

Subsequent to step S8 or step S9, the power transmitter 100 determines whether the directivity generation process is performed on all the wireless sensors 200. When the processing is performed on all the wireless sensors 200 (Yes in S10), the processing advances to step S11. The processing in steps S1 to S9 is repeated when the processing has yet to be performed on all the wireless sensors 200.

In S11, the power exposure on a human body obtained from the human body tag 300 in each slot is used to determine power exposure on a human body per cycle. In other words, when the directivity control period includes three slots as in the above example, the power exposure on a human body per cycle is determined as the average of power exposure on a human body over the three slots. For multiple human body tags 300, the power exposure on a human body per cycle is determined for these human body tags 300. The power exposure on a human body per cycle may be determined, rather than by averaging the power exposure on a human body for all slots, by averaging power exposure on a human body over a predetermined number of slots.

When the power exposure on a human body per cycle obtained in S11 is less than or equal to a predetermined value (Yes in S12), the power transmitter 100 transmits power normally (S13) in the power transmission-communication period. In the normal power transmission sequential process, the array antenna 150 sequentially uses different antenna directivity to transmit power to a different wireless sensor 200 without limiting the transmission power. The predetermined value is set in accordance with the safety standards in the Radio Radiation Protection Guidelines. When the power exposure on a human body per cycle is less than or equal to the predetermined value, no adverse effects are expected on the human body.

When the power exposure on a human body per cycle obtained in S11 is greater than the predetermined value (No in S12), the power transmitter 100 limits the power transmission (S14). Limiting the power transmission includes lowering transmission power during power transmission or stopping power transmission. More specifically, the transmission power calculator (transmission power limiter) 142 can limit the transmission power by reading appropriate transmission power corresponding to the estimated power exposure on a human body from the table stored in the storage 160. Limiting the power transmission in this manner allows the system to prevent power exposure on a human body from exceeding the safety standards in the Radio Radiation Protection Guidelines. For multiple human body tags 300, at least one of the multiple human body tags 300 with the power exposure on a human body per cycle exceeding the predetermined value causes negative determination in S12, and the power transmission is limited in S14.

The system uses the human body tag 300 to estimate power exposure on a human body per slot. However, the estimated power exposure per slot may have an increased estimation error. Thus, the system does not limit the power transmission when the power exposure per slot exceeds the predetermined value, but limits the power transmission when the power exposure per cycle exceeds the predetermined value. The estimation error in power exposure per slot is more likely to differ greatly due to different antenna directivity during power transmission and is expected to occur with no specific direction. Thus, averaging power exposure over multiple slots allows power exposure per cycle with a decreased estimation error through the averaging. This allows the system to increase transmission power to power transmission targets and to reduce the power exposure on a human body in the environment in which power is transmitted.

The system produces the advantageous effects described above when power exposure on a human body over multiple slots is averaged. In other words, multiple wireless sensors 200 serving as secondary units produce the advantageous effects, and more slots (more wireless sensors 200) generate more advantageous effects.

The system described above estimates power exposure on a human body with a program executable by a central processing unit (CPU) (e.g., the central controller 140) included in the power transmitter 100. One or more embodiments of the present invention cover the program or a computer-readable recording medium storing the program.

In one or more embodiments of the present invention, the recording medium may be a memory such as a read-only memory (ROM) used for the processing in the central controller 140 shown in FIG. 1 and serving as a program medium, or may be a program medium readable upon insertion of the recording medium into a program reader provided as an external storage device (not shown). In either case, a microcomputer may access and execute the stored program or read and load the program in a program storage area in the microcomputer before executing the program. A program for the loading is prestored in the main device.

The above program medium is a recording medium separable from the main device, and may be a medium that stores the program in a non-transitory manner. The medium may be tape such as magnetic tape or cassette tape, a magnetic disk such as a flexible disk (FD) or a hard disk (HD), an optical disc such as a compact disc ROM (CD-ROM), a magneto-optical (MO) disk, a minidisc (MD), a digital versatile disc (DVD), or a blue-ray disc (BD), a card such as an integrated circuit (IC) card (including a memory card) or an optical card, or a semiconductor memory including a mask ROM, an erasable programmable ROM (EPROM), an electrically erasable programmable ROM (EEPROM), or a flash ROM.

One or more embodiments of the present invention may include a system connectable to a communication network including the Internet, and the medium may maintain the program flexibly by downloading the program from the communication network. A download program for downloading the program from the communication network as described above may be prestored in the main device or may be installed from another recording medium.

The embodiments described above are mere examples in all respects and should not be construed to be restrictive. The technical scope of the present invention is not construed merely by the embodiments described above and is defined by the claims. All changes that come within the meaning and range of equivalency of the claims fall within the claims.

This international application claims priority to Japanese Patent Application No. 2020-023113, filed with the Japanese Patent Office on Feb. 14, 2020, the entire contents of which are incorporated herein by reference.

REFERENCE SIGNS LIST 100 power transmitter (host unit)
110 signal transmitter
111 power transmission signal transmitter
112 communication signal transmitter
113 signal divider
120 signal receiver
121 signal combiner
122 signal determiner
130 antenna directivity controller
131 phase-amplitude adjustment calculator
132 phase-amplitude adjuster
140 central controller
141 power exposure estimator
142 transmission power calculator (transmission power limiter)
150 array antenna
160 storage
200 wireless sensor (secondary unit)
210 power supply
220 sensor unit
230 storage
240 communicator
250 antenna
300 human body tag
310 power supply
320 power monitor
330 storage
340 communicator
350 antenna

The invention claimed is:

1. A wireless power transmission system, comprising:
a host unit configured to output a power transmission radio wave;
a plurality of secondary units configured to receive power from the power transmission radio wave; and
at least one human body tag to be carried on a human body in an environment in which the host unit transmits power, the at least one human body tag being configured to wirelessly communicate with the host unit,
wherein power transmission from the host unit to the plurality of secondary units undergoes directivity control using different antenna directivity for each of the plurality of secondary units,
directivity control for a secondary unit of the plurality of secondary units is performed for one slot,
directivity control for all the plurality of secondary units is performed for one cycle,
the host unit communicates with the at least one human body tag in each slot to estimate power exposure on a human body per slot for a human body carrying the at least one human body tag, calculates power exposure on a human body per cycle based on the estimated power exposure on a human body in each slot, and limits power transmission to the plurality of secondary units in response to the power exposure on a human body per cycle exceeding a predetermined value, and the human body tag is a separate unit from the host unit and the secondary unit.

2. The wireless power transmission system according to claim 1, wherein
the host unit communicates with the at least one human body tag in each slot to estimate power exposure on a human body per slot for a human body carrying the at least one human body tag, and calculates power exposure on a human body per cycle as an average of power exposure on a human body for all slots or for one or more slots.

3. The wireless power transmission system according to claim 1, wherein
the at least one human body tag measures received power from a signal received from the host unit to transmit the measured received power to the host unit, and
the host unit estimates power exposure on a human body per slot based on the measured received power transmitted from the at least one human body tag.

4. A non-transitory computer-readable storage medium storing a program for estimating power exposure on a human body executable in a wireless power transmission system comprising a host unit configured to output a power transmission radio wave and a plurality of secondary units configured to receive power from the power transmission radio wave, the program being executable to estimate power exposure on a human body in an environment in which the host unit transmits power,
the system comprising at least one human body tag to be carried on a human body in the environment in which the host unit transmits power, the at least one human body tag being configured to wirelessly communicate with the host unit,
power transmission from the host unit to the plurality of secondary units undergoing directivity control using different antenna directivity for each of the plurality of secondary units,
the host unit comprising a computer configured with the program to perform operations comprising:
operation as a power exposure estimator configured to estimate, based on a result of communication with the at least one human body tag in each slot, power exposure on a human body per slot for a human body carrying the at least one human body tag and calculate power exposure on a human body per cycle based on the estimated power exposure on a human body in each slot, and
operation as a transmission power limiter configured to limit power transmission to the plurality of secondary units in response to the power exposure on a human body per cycle exceeding a predetermined value,
the human body tag is a separate unit from the host unit and the secondary unit.

5. The non-transitory computer-readable storage medium storing the program according to claim 4, wherein
operation as the power exposure estimator estimates, based on a result communication with the at least one human body tag in each slot, power exposure on human body per slot for a human body carrying the at least one human body tag, and calculates power exposure on a human body per cycle as an average of power exposure on a human body for all slots or for one or more slots.

6. The wireless power transmission system according to claim 2, wherein the at least one human body tag measures received power from a signal received from the host unit to transmit the measured received power to the host unit, and the host unit estimates power exposure on a human body per slot based on the received power transmitted from the at least one human body tag.

\* \* \* \* \*